US005472182A

United States Patent [19]
Han

[11] Patent Number: 5,472,182
[45] Date of Patent: Dec. 5, 1995

[54] FEEDER MECHANISM FOR A PORTABLE IMAGE SCANNER

[75] Inventor: Loi Han, Alhambra, Calif.

[73] Assignee: Microtek Lab, Inc., Redondo Beach, Calif.

[21] Appl. No.: 141,250

[22] Filed: Oct. 22, 1993

[51] Int. Cl.⁶ .................................................. B65H 5/22
[52] U.S. Cl. ........................ 271/3.13; 271/274; 235/475
[58] Field of Search .............................. 271/3, 248, 273, 271/274; 235/475

[56] References Cited

U.S. PATENT DOCUMENTS

| | | | |
|---|---|---|---|
| 3,999,749 | 12/1976 | Zambolin et al. | 271/274 |
| 4,482,148 | 11/1984 | Stewart | 271/274 |
| 5,120,038 | 6/1992 | Takimoto et al. | 271/3 |
| 5,173,596 | 12/1992 | Kapinos et al. | 271/274 |
| 5,243,908 | 9/1993 | Gilham | 271/274 |

FOREIGN PATENT DOCUMENTS

| | | | |
|---|---|---|---|
| 0125482 | 7/1984 | Japan | 235/475 |
| 0112351 | 5/1988 | Japan | 271/248 |
| 013343 | 1/1989 | Japan | 271/273 |
| 504205112 | 8/1993 | Japan | 235/475 |

Primary Examiner—H. Grant Skaggs
Attorney, Agent, or Firm—Small Larkin & Kidde

[57] ABSTRACT

A document feeder which can be coupled to a motorized, portable optical scanner to feed documents across the scanner window of the scanner, including a housing with a support surface and an opposite offset platform surface which together form a slit through which the document is fed and including openings in the support surface for a drive and a drive set of spring-loaded rollers which are coupled together by a belt, and which extend partially below the platform surface and are adapted to cooperate with drive roller(s) of the motorized, portable optical scanner to feed documents across the scanner.

7 Claims, 3 Drawing Sheets

FEEDER MECHANISM FOR A PORTABLE IMAGE SCANNER

BACKGROUND OF THE INVENTION

1. Field of the Invention

The present invention relates to a document or sheet feeder mechanism for a portable optical scanner.

2. Description of the Related Art optical scanners are typically used to read the surface of a document having either textural and/or graphical information and to convert the information into digital signals which can be stored and processed by a digital computer. The scanned, digital information then can be used for a variety of applications. For example, scanned, digitized textural information may be stored in a database, wherein the user can search for desired documents by initiating a "word search," and scanned, digitized graphical information may be edited, and processed for pictorial print-out.

Optical scanning units are commercially available in a number of different sizes and configurations. Some of the relatively large, stationary units contain an integral document feeder mechanism which moves and scans the document(s) in a manner similar to that of a photocopying machine. Although effective in scanning documents, large stationary optical scanners typically occupy a relatively large amount of office space.

Other types of scanners include portable optical units which can be rolled across or passed over a document. These portable scanners are typically hand-held or motorized so that they can scan under their own power once placed on the document. The width of portable scanners typically is about 4" to 4½" so that it can scan an 8½" by 11" sheet of paper with two lengthwise passes. The user must move the portable, hand-held scanner in a lengthwise direction over the sheet two times to scan the entire contents of the document. Such a procedure is typically cumbersome, uneven, and results in errors in scanning due to the lack of stability of the hand. The portable, motorized scanner has wheels or rollers that move the scanner across the document once properly placed on the document and energized. However, the motorized scanner must be used on a relatively flat surface. Using a working surface with a grade may cause the scanner to drift from the document. The portable motorized scanner is an improvement over the portable, hand-held scanner in that it gives more steady movement, and thus more uniform results. However, when smaller document such as photographs or business cards are scanned, they are so small that both the hand-held and motorized portable scanners are unable to provide consistent and uniform results. Also, these types of portable scanners are awkward to use with small documents.

OBJECTS AND SUMMARY OF THE INVENTION

The primary object of the present invention is to provide a document feeder for a portable scanner for scanning small documents with ease, and with constant results, by virtue of its steadiness and absence of need for manipulation by the user.

Another object of the present invention is to provide an adapter that can be coupled to a motorized optical scanner to feed a document across the scanner.

The present invention is a document or sheet feeder that can be coupled to a motorized portable optical scanner to feed documents across the scanner. The adapter document feeder includes a housing with a support surface and an opposite platform surface. Extending through openings in the platform surface are a first set of rollers and a second set of rollers. The rollers are supported by a pair of axles that are coupled together by a drive belt. The rollers extend partially above the platform surface and are adapted to cooperate with a drive roller of the motorized portable, optical scanner to feed a document across the scanner.

The document feeder is operated by first attaching the motorized portable, optical scanner to the adapter so that the drive rollers of the portable scanner are in contact with the driver rollers of the feeder. A document is placed between the drive rollers of the scanner and the drive roller of the feeder, wherein the rotation of the scanner drive roller pulls the document across the scanner. The rollers of feeder contain a spring mechanism which allows them to move to compensate for the thickness of the document.

BRIEF DESCRIPTION OF THE DRAWING(S)

The objects and advantages of the present invention will become more readily apparent to those ordinarily skilled in the art after reviewing the following detailed description and accompanying documents, wherein.

DESCRIPTION OF THE PREFERRED EMBODIMENT(S)

Figure 1:
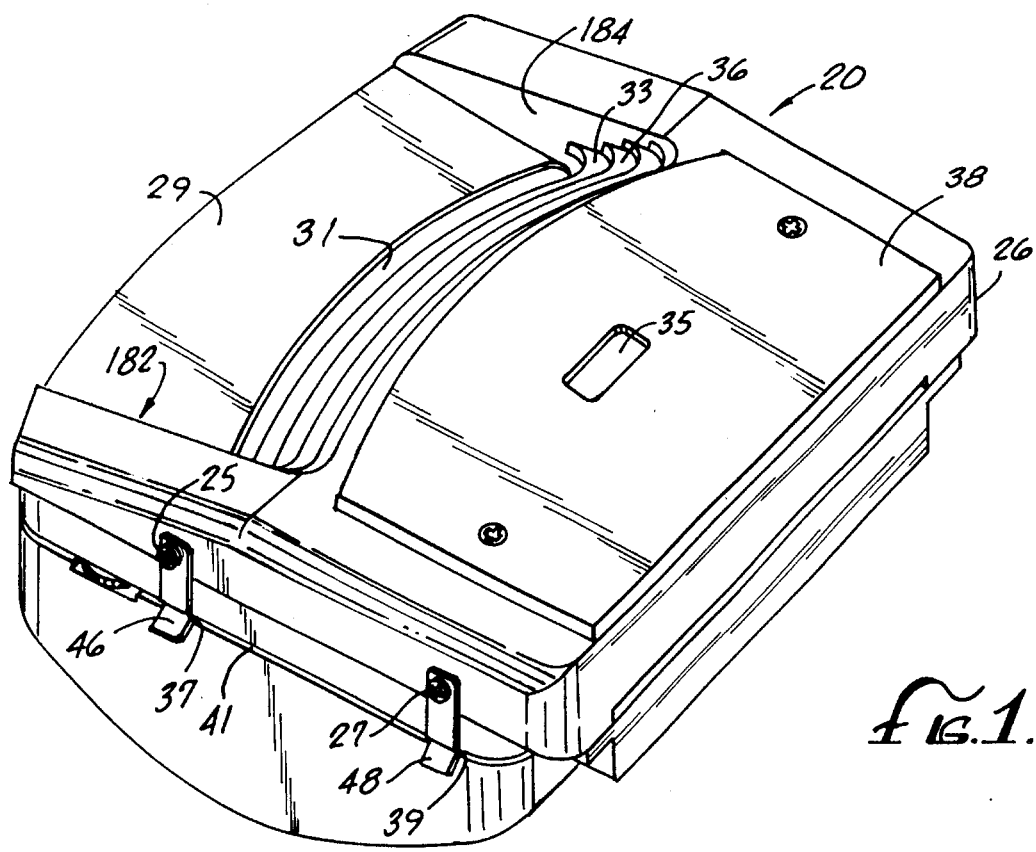
FIG. 1 is a perspective view of a preferred embodiment of the document feeder of the present invention attached to a conventional motorized, portable, optical scanner.
Figure 2:
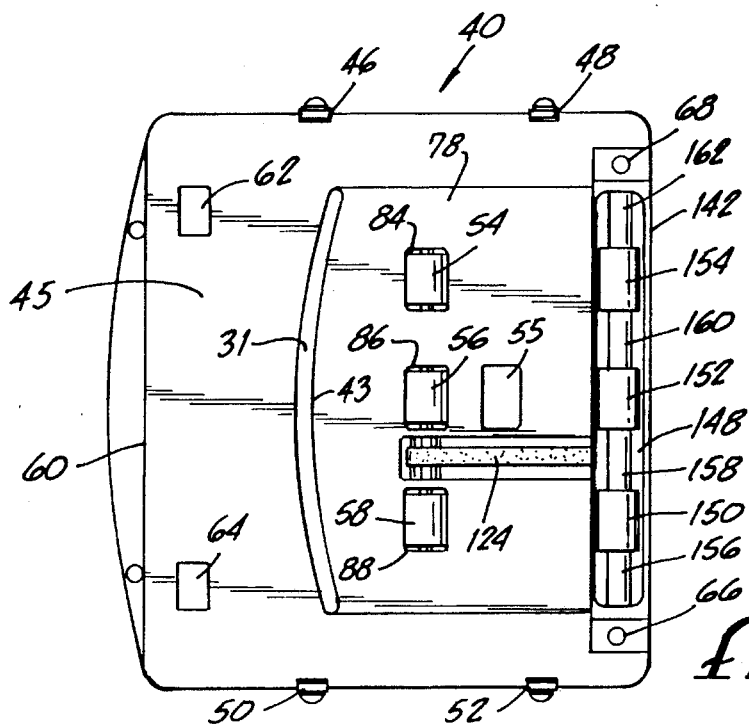
FIG. 2 is a bottom view of the document feeder of FIG. 1.

Referring to the drawings more particularly by reference numbers, FIG. 1 shows a sheet or document feeder 20 coupled to a conventional motorized, portable optical scanner 22. The coupled feeder 20 and portable motorized scanner 22 provide a mechanism which allows a small sheet or document, such as a photograph or business card, to be pulled across the scanning window of the scanner 22. The feeder 20 is fastened to the scanner 22 by conventional clips, two of which 46, 48, are shown in FIG. 1, and which in turn are fastened to the feeder 20 by any suitable conventional means, such as screws 25, 27. Angled portions 37, 39 of the clips snap into the gap 41 in the housing of the scanner 72. Support surface 29 is sized and adapted to receive small documents such as photographs or business cards and to facilitate insertion of the document through slit 31. The support surface may be inclined or parallel to the bottom or platform surface 40 of the feeder as shown in FIG. 2. Housing cover plate 38 has a viewing hole 35, through which the user can monitor progress of the document through the feeder.

Figure 3:
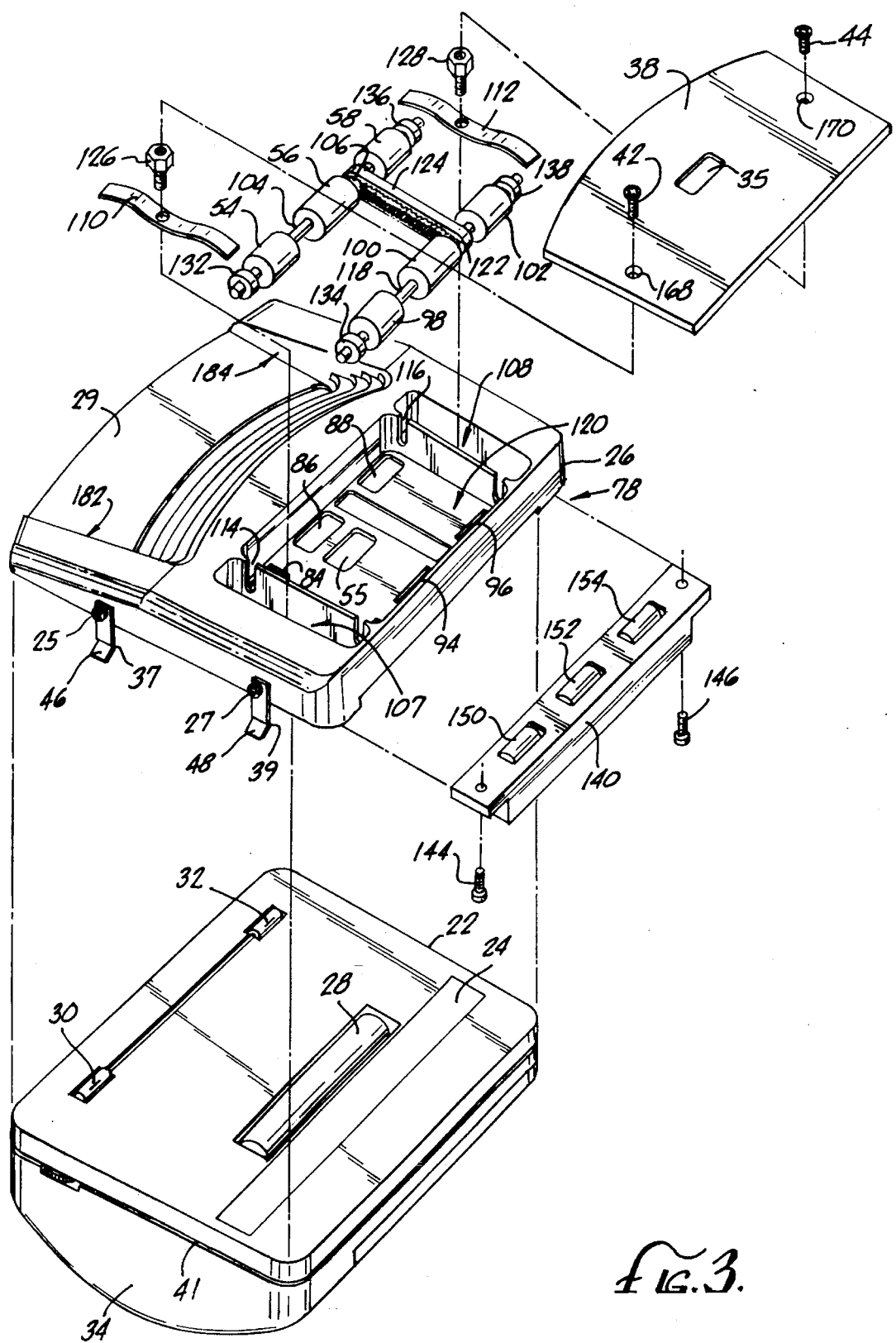
FIG. 3 is a combined exploded view of the preferred document feeder and bottom perspective view of the conventional portable, optical scanner of FIG. 1.
Figure 4:
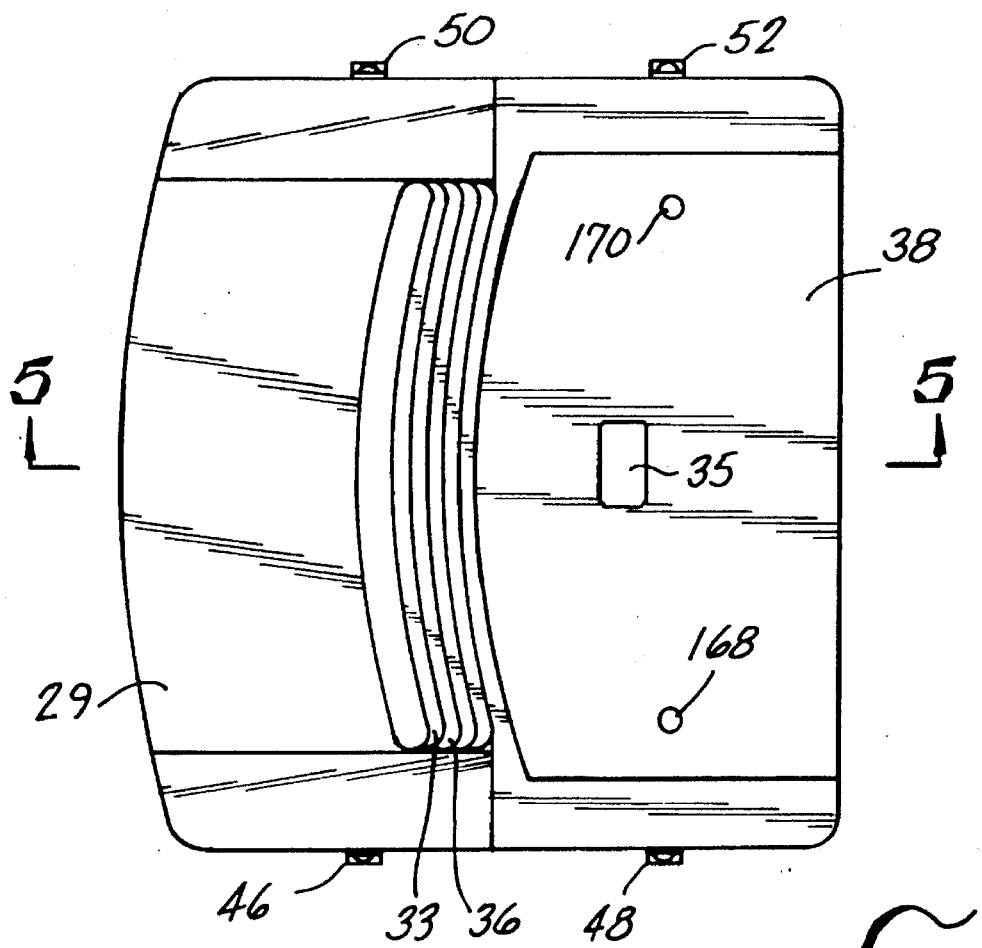
FIG. 4 is a top view of the document feeder of FIG. 1.
Figure 5:
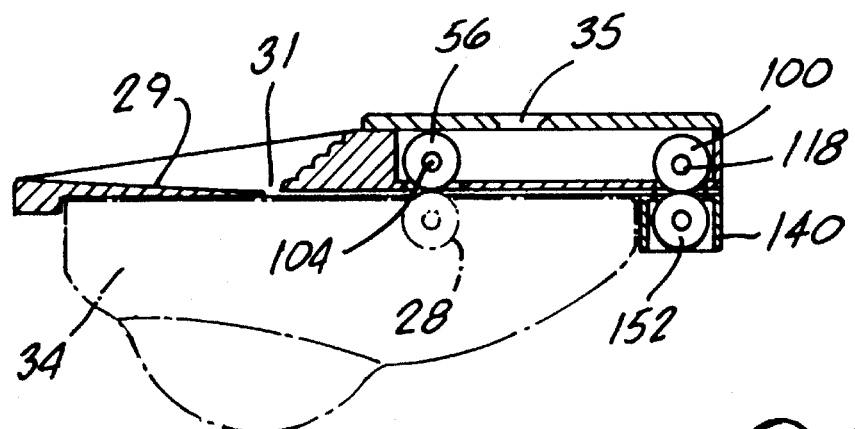
FIG. 5 is a side, cross-section view taken through line 5—5 of the feeder of FIG. 1.

Referring to FIGS. 2 and 3, the bottom of the feeder 20 has a platform surface 40, which when in operation is placed against and faces the bottom or working surface of scanner 22. Feeder drive rollers 54, 56 and 58 and viewing window 35 are shown in a recessed area 78, which is flat and of a generally rectangular configuration, but offset from the primary portion 45 of the surface 40. Arcuate slit 31 is also shown as forming the leading edge of the recessed area 78. The slit 31 may be of arcuate configuration, or of rectangular configuration, and also may be such that its lower edge is co-planar with its upper edge, so that in a bottom view such as FIG. 2, the slit 31 would appear as a straight line. Feeder driven rollers 98, 100 and 102 are also shown.

As shown in FIG. 3, the conventional motorized scanner unit 22 contains an optical scanner window 24 which can sense the opaqueness of the surface of a document or sheet through use of a conventional charge coupled device ("CCD") and conventional technology whereby the text or image on the surface of the sheet is converted to digital signals. The window is coupled to a receiver such as a conventional computer by a cable, not shown. The scanner 22 also contains a drive roller 28 and a pair of guide rollers 30, 32. The scanner drive roller 28 is rotated by a conventional motor, not shown, within the scanner 22. The scanner outer housing 34 is small enough to hold in the palm of an average, adult human hand. The motorized, portable optical scanner 22 is conventionally operated by placing it on a stationary document and turning on the motor, so that the drive roller 28 moves the scanner 22 across the document.

The feeder 20 includes a housing 26 and a cover plate 38 that is attached by screws 42, 44. The platform surface 40 is placed on the working surface of the scanner 22, and attached with clips 46, 48, 50, 52 in a position so that the feeder drive rollers 54, 56 and 58 are directly opposite and in physical contact against the scanner drive roller 28. The forward edge, or lip 60 enables the platform surface and thus the feeder to be located and aligned properly with respect to the motorized scanner 22 so that documents or sheets fed into the feeder will pass by the window in a proper and uniform orientation. Rectangular shaped indentations 62, 64 are provided in the surface 45 to assist fitting the feeder to the scanner by providing a recess with which the rollers 30, 32 may rest. Near the rear wall of the platform surface 40 are holes 66 and 68 for attaching a driven roller housing 140. Attached to the sides of the platform surface 40 are conventional clips 46, 48, 50 and 52 which function to attach the feeder 20 to the scanner 22. The clips may be attached to the base plate in any conventional manner, such as with conventional screws 25, 27. The housing 26 also has a recessed area 78, which is generally rectangular, has a flat bottom wall and is offset from the remaining surface 45 of the bottom of the surface 40. Also shown is arcuate slit 31, through which each sheet or document is fed. The slit 31 may be of an arcuate or straight configuration and the degree of lateral offset of the leading edge 43 of recessed area 78 from the adjacent edge of surface 45 of the bottom of the platform surface may vary and the slit may be of different shapes, dimensions and widths, so long as the slit 31 functions to permit sheets or documents to be fed therethrough and scanned.

The offset region or area 78 of the platform surface 40 has rectangular openings 84, 86 and 88 for permitting the feeder drive rollers 54, 56 and 58 to protrude therethrough. The number of holes and number of feeder drive rollers may be varied, provided that they function to respond to movement generated by the scanner drive roller 28 and to move the sheet or document through the feeder. Rectangular slit 55 provides for visual observation by the user of the document or sheet as it passes through the feeder. Near the rear edge of the offset region 78 of the base plate 40 are rectangular slits or holes 92, 94 and 96 through which driven rollers 98, 100 and 102 extend.

The feeder drive rollers 54, 56 and 58 are positioned on feeder drive axle 104. The drive axle 104 also has postioned thereon a first drive gear 106 and extends at either end into a left spring cavity 107 and right spring cavity 108. Left leaf spring 110 and right leaf spring 112 force the axle 104 toward the bottom of left axle slit 114 and right axle slit 116 when the feeder is not in use and permit the axle 104 and the feeder drive rollers 54, 56 and 58, to retract as a document or sheet is fed through the feeder, but to provide a frictional force on the document as it passes through the feeder.

The feeder driven axle 118 is positioned at the opposite end of the rectangular roller chamber 120 and has positioned thereon feeder driven rollers 98, 100 and 102 as well as feeder driven axle gear 122, which is preferably identical to drive gear 106. The rollers 54, 56, 58, 98, 100 and 102 are preferably made of elastomeric material. The feeder driven axle ends also extend into the left spring cavity 107 and right spring cavity 108, and is retained in a spring loaded position by the left leaf spring 110 and right leaf spring 112 as is the feeder drive axle 104. The feeder drive axle is coupled to the feeder driven axle with a notched belt 124, the notches of which are sized to mesh with the teeth of the feeder drive gear 106 and the feeder driven gear 122, respectively. The left leaf spring 110 is attached to the feeder through conventional left screw/nut 126 and the right leave spring 112 is retained by conventional right screw/nut 128, the screws 42, 44 of cover plate 38 being received by the threaded head, or nut portion of the screws 126, 128, respectively. The belt 124 couples the feeder drive rollers and feeder driven rollers so that rotation of the drive rollers induces a rotation of the driven rollers. The gears 106 and 122 preferably have the same diameter and same teeth size so that the drive rollers and driven rollers rotate with the same velocity and the notches 130 on the belt 124 mesh evenly with the gear teeth on the gears 106 and 122. Alternatively, a pair of pulleys and a smooth belt could be used instead of gears 106, 122, and notched belt 124.

The axles 104 and 118 optionally include the conventional bushings 132, 134, 136 and 138 at either end and which are captured by the left and right axle slits or guides 114, 116. These bushings, as well as the axles, are thus allowed to translate relative to the guides or slits 114 and 116 so that the rollers and axles can move relative to the platform surface. When the housing is of a metal construction, bushings are preferably used. For housings of plastic construction, preferably no bushings are used.

In operation, the document or sheet is placed on the support surface 29 of feeder, and preferably, one edge of the document is aligned along one of the side walls 182, 184 of the feeder housing to provide for a straight and uniform feed of the document through the slit. As shown in FIGS 1 and 3, the forward wall of the housing above the slit 31 has a stepped, arcuate configuration with a plurality of steps 33, 36, etc. The preferable vertical gap dimension for the slit 31 is about 1.5 mm, to allow for about a 1.0 mm distance for the extending rollers and about 0.5 mm for the thickness of the document.

Attached to the rear edge of the platform 40 is a driven guide roller housing 140 in which a driven guide roller chamber 142 holds fixed axle 148 (not shown) and driven guide rollers 150, 152 and 154. These rollers are separated by spacers 156, 158, 160 and 162. The spacers are made of an appropriate, low friction material such as Teflon® or plastic. The various rollers 150, 152 and 154 are preferably made of a hard material, such as a hard plastic. Optionally, the assembly could be adapted for rotation of the axle. The housing 140 is attached to the base with conventional screws 144 and 146. The top of the roller chamber 120 is covered with top plate 38 having a top plate aperture 35 for viewing movement of the sheet or document through the feeder by the user. Top plate 38 also has openings, or holes 168 and 170 through which screws 42 and 44 are screwed into threaded nuts 126 and 128 to retain the top plate 164 in place.

In operation, the feeder 10 is placed on the working surface, or bottom of the scanner 22 so that it is held in place by the clips 46, 48, 50 and 52 such that the scanner drive roller 28 is directly opposite the feeder drive rollers 54, 56 and 58. The offset of the slit 31 provides a suitable gap for the document or sheet to be fed through while the rollers are in contact with each other and when pushed through by the user. Once pushed through the gap and with its leading edge contacting the rollers, the document will force the spring-loaded feeder drive rollers and axle to retract partially and once the leading edge of the document begins contact with the rollers, the drive rollers of the motorized scanner then move the document or sheet through the feeder and past the scan window. Rotation of the feeder drive rollers is translated to the feeder driven rollers through the drive belt. The movable bushings permit the feeder drive rollers and driven rollers to translate away from the document and in order to compensate for the thickness of the document or sheet. The present sheet or document feeder thus permits a motorized, portable optical scanner to be converted into a stationary feeder which is easy to operate, provides an accurate and repeatable method of scanning for small documents and sheets.

Although the drive belt 124 is shown positioned within the chamber 120, it may alternatively be positioned in a side chamber similar to chamber with the leaf spring being inside of the main chamber 120.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

I claim:

1. A sheet feeder adapter for use with a portable, motorized scanner having a scanner driver roller to move said scanner across a sheet comprising:

a roller housing having two side walls and a support surface;

said roller housing removably connected to said scanner and including at least one feeder driver roller and a first axle that rotates in response to said scanner driver roller to move said sheet over the surface of said scanner driver roller;

the two side walls extending in a first direction perpendicular to the axis of rotation of said first axle;

a platform surface extending between the two extended side walls having an offset region and positioned in relation to said support surface such that said support surface forms a plane traversing said platform surface, whereby a slit is formed between the two side walls and between said offset region and said support surface for insertion of said sheet therethrough;

a spring adapter to bias said feeder driver roller and said first axle in a first direction toward said scanner; and a second axle rotatably positioned in said roller housing and at least one driven roller connected to said second axle that rotates in response to rotation of said feeder driver roller and said first axle.

2. The adapter as recited in claim 1, further comprising a belt coupled to said first and second axles.

3. An adapter for a portable, hand-held optical scanner having a scanner drive roller to move said portable scanner over a stationary sheet, comprising:

a housing having an upper support surface and a platform surface, said platform surface having a recessed area and a plurality of openings;

a feeder drive roller positioned to partially extend from one of said housing openings;

a first driven roller positioned to partially extend from one of said housing openings;

fastening means for fastening said housing to said portable scanner;

coupling means for coupling said feeder drive and driven rollers; and whereby fastening said adapter to said portable scanner converts said portable scanner to a stationary scanner.

4. The adapter as recited in claim 3, further comprising a spring which biases said feeder drive and driven rollers toward said platform surface.

5. The adapter as recited in claim 4, further comprising bushings which couple said feeder drive and said driven rollers to said housing, said bushings being adapted to move relative to said housing.

6. The adapter as recited in claim 5, further comprising a first axle connected to said feeder drive rollers and a second axle connected to said driven rollers, said axles being rotatably connected to said bushings.

7. The adapter as recited in claim 6, wherein said means for coupling includes a belt coupled to said first and second axles.

* * * * *